United States Patent [19]

Stuart et al.

[11] 4,380,062
[45] Apr. 12, 1983

[54] COMMUNICATION SYSTEM PROVIDING SIMULTANEOUS TWO-WAY TRANSMISSION

[75] Inventors: Richard L. Stuart, Columbia, Md.; Fred C. Killmeyer, Palm Bay, Fla.

[73] Assignee: Rixon, Inc., Silver Spring, Md.

[21] Appl. No.: 256,422

[22] Filed: Apr. 22, 1981

[51] Int. Cl.³ .............................................. H04B 1/56
[52] U.S. Cl. ......................................... 370/20; 370/24
[58] Field of Search ...................... 370/20, 24, 27, 19, 370/71

[56] References Cited

U.S. PATENT DOCUMENTS

| | | | |
|---|---|---|---|
| 3,082,296 | 3/1963 | Caruthers | 370/20 |
| 3,601,538 | 8/1971 | May et al. | 370/71 |
| 3,626,297 | 12/1971 | Green et al. | 370/20 |
| 3,700,817 | 10/1972 | Garcia et al. | 370/71 |
| 3,732,375 | 5/1973 | Kuribayashi | 370/20 |
| 3,733,438 | 5/1973 | Haley et al. | 370/121 |
| 3,758,719 | 9/1973 | Klose | 370/29 |
| 3,775,561 | 11/1973 | Guckel | 370/27 |
| 3,809,816 | 5/1974 | Reed et al. | 370/30 |
| 3,822,366 | 7/1974 | O'Dea et al. | 370/71 |
| 3,836,720 | 9/1974 | Getgen | 370/51 |
| 3,859,469 | 1/1975 | Getgen | 370/30 |
| 4,075,427 | 2/1978 | Mattson et al. | 370/20 |

*Primary Examiner*—Douglas W. Olms
*Attorney, Agent, or Firm*—Dale Gaudier

[57] ABSTRACT

A two-wire, carrier-type communication system is provided which enables simultaneous two-way transmission over two-wire circuits in the same spectrum. Carrier signals in quadrature are used to allow separation of signals within the same frequency spectrum. The carrier recovered at each subscriber station is used to demodulate the received signal and, after being phase shifted 90°, is applied as carrier to the transmitter modulator. The transmitters at the subscriber stations are thus the same as that at the central office but are locked to the receiver and 90° out of phase. A bidirectional control phase adjustment network at the central station adjusts the phase of the signal received thereby until the received carrier is 90° out of phase with the transmit carrier.

17 Claims, 4 Drawing Figures

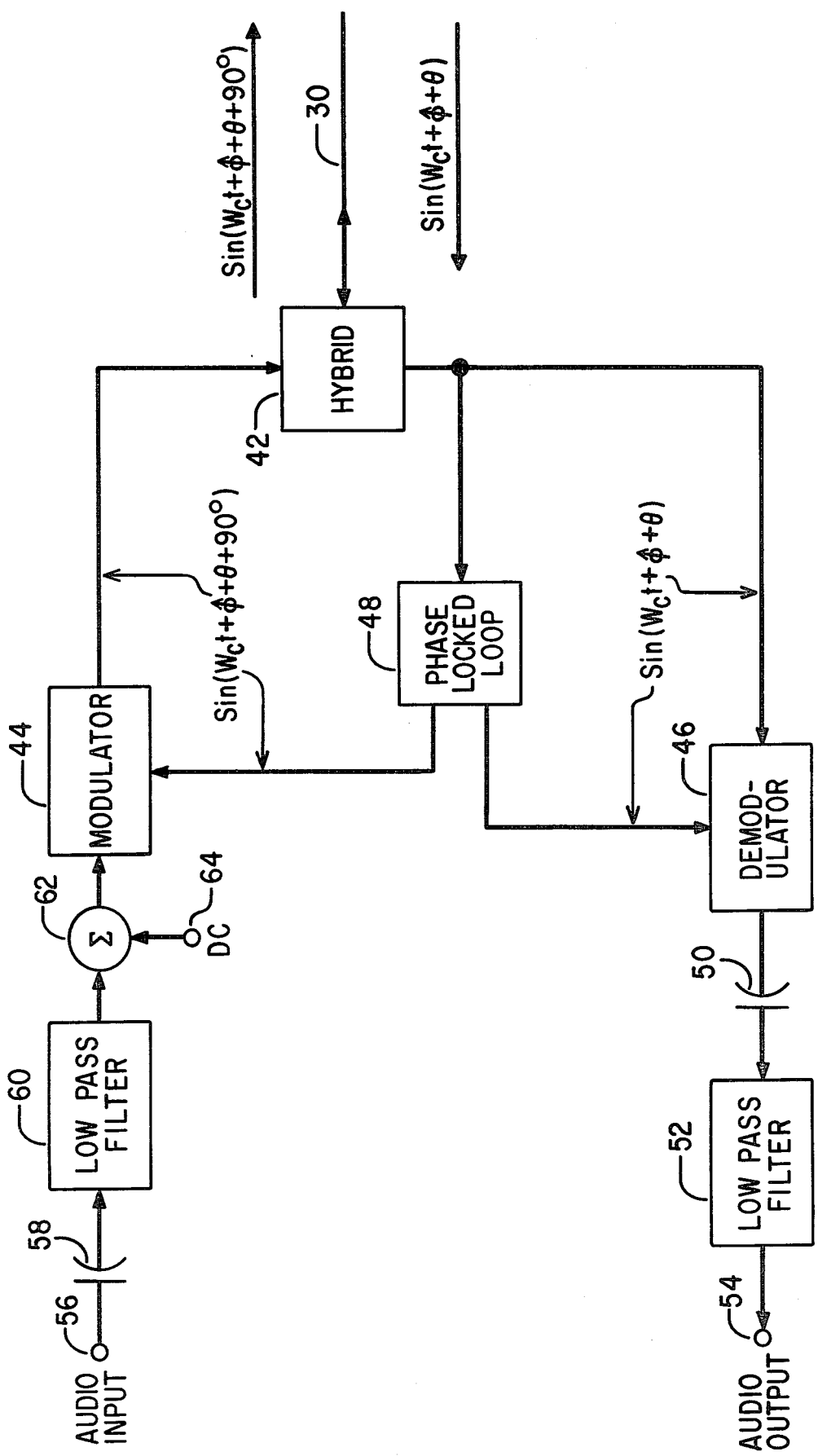

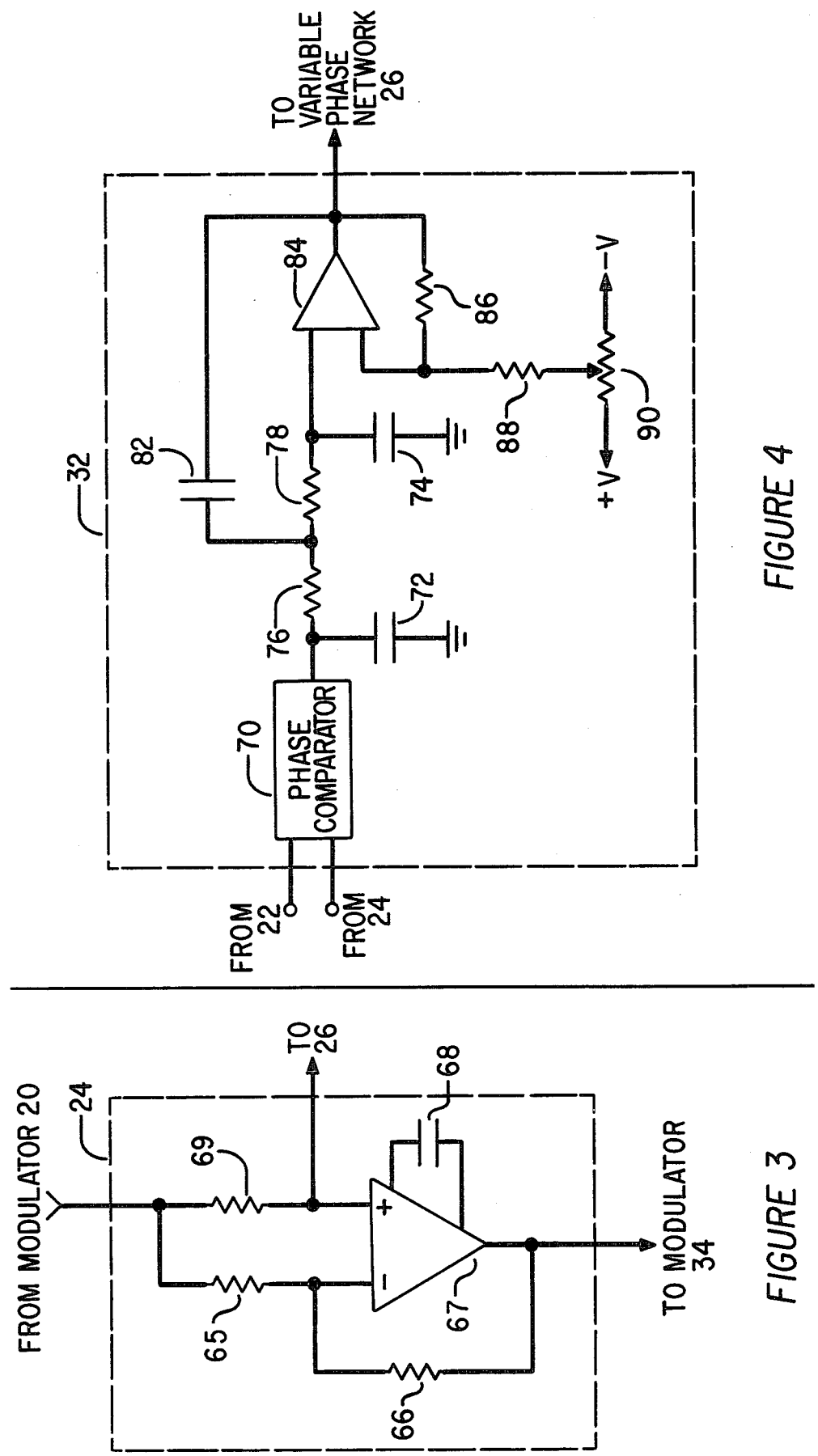

COMMUNICATION SYSTEM PROVIDING SIMULTANEOUS TWO-WAY TRANSMISSION

FIELD OF THE INVENTION

The present invention relates to a communication system which enables simultaneous two-way transmission in the same spectrum and is particularly adapted for use in two-wire telephone subscriber carrier applications.

BACKGROUND OF THE INVENTION

Economic factors dictate the use of multi-party lines under circumstances where, as in some rural areas, there are a limited number of subscribers in a given locale. This multi-party approach provides for the use of one pair of wires by many customers and can be accomplished by the use of party lines or the use of prior art subscriber carrier systems wherein each subscriber is assigned a particular frequency spectrum for his transmitter and another spectrum for his receiver. The obvious advantage of the subscriber carrier approach is that each subscriber can use his telephone independently of others using the same pair of wires, thereby providing private service over the shared wires. In general, prior art subscriber carrier systems utilize a separate spectrum for transmitting and receiving for each subscriber. Thus, a five subscriber system requires ten spectral bands. Because of cable losses and crosstalk, the upper frequency is limited to about 150 KHz. Due to these constraints, for conventional systems now in common use, the number of subscribers is generally limited to about five to eight per pair of wires. Thus, in order to service twelve subscribers, two or three pairs of wires would be required.

The present invention concerns the provision of a system which enables transmission in both directions in the same spectrum and thus allows doubling of the number of customers as compared with conventional systems without the use of any additional lines. Thus, in this system, a five subscriber set-up requires five spectral bands only.

An approach developed independently of the present invention but bearing some broad similarity thereto is disclosed in U.S. Pat. No. 3,822,366 (O'Dea et al). This patent concerns a one channel carrier intercom system wherein transmission and reception take place in the same spectrum but not simultaneously. The system is intended for use by telephone men for conversation on an in-use physical pair of wires, rather as a full carrier system. The carrier is sent to the receiver by a simplex connection of the wire pair. The carrier is applied between ground and the wire pair so that the receiver recovers the carrier between the wire pair and ground, and recovers the signal across the pair. A diode ring acts as both the modulator and demodulator in this system. It will be evident from the description of the present invention set forth hereinbelow that the system of the present invention is quite different from that of the O'Dea et al patent.

SUMMARY OF THE INVENTION

A communication system is provided which, as noted above, can enable the transmission of twice as many channels over a given pair of wires, using the same bandwidth, as conventional telephone subscriber systems. Although the invention is particularly adapted for telephone subscriber application, the invention can also be applied to other communication systems as well.

According to a preferred embodiment, a two-wire carrier communication system is provided wherein, at a central station or unit, for each channel a transmit carrier and receive carrier are generated which are 90° out of phase, independently of the remainder of the system. The transmit modulator of each channel is connected to a hybrid which permits the transmit signal to drive the two-wire line while serving to isolate the central station receiver.

At each of the subscriber stations, the carrier, at its assigned frequency, is recovered and is used to demodulate the received signal. Moreover, after being phase shifted by 90°, the recovered carrier is modulated by the subscriber transmit signal. Each of the carriers received at the central station from the subscriber stations are delayed to align this carrier to the internal reference carrier. This delay is necessary to compensate for cable propagation delays which cause this received signal carrier to no longer be in quadrature to the central office transmit carrier. By maintaining the 90° phase difference between the transmitted and received carriers, interference is kept at a minimum.

A d.c. signal is advantageously added to the audio input signal for each channel in advance of the first station transmit modulator to ensure that its carrier is transmitted at all times.

Other features and advantages of the invention will be set forth in, or apparent from, the detailed description of a preferred embodiment found thereinbelow.

BRIEF DESCRIPTION OF THE DRAWINGS

FIG. 2 is a schematic circuit diagram, in block form, of a preferred embodiment of a subscriber station; and FIGS. 3 and 4 are schematic circuit diagrams of two of the units of FIG. 1.

DESCRIPTION OF THE PREFERRED EMBODIMENTS

Figure 1:
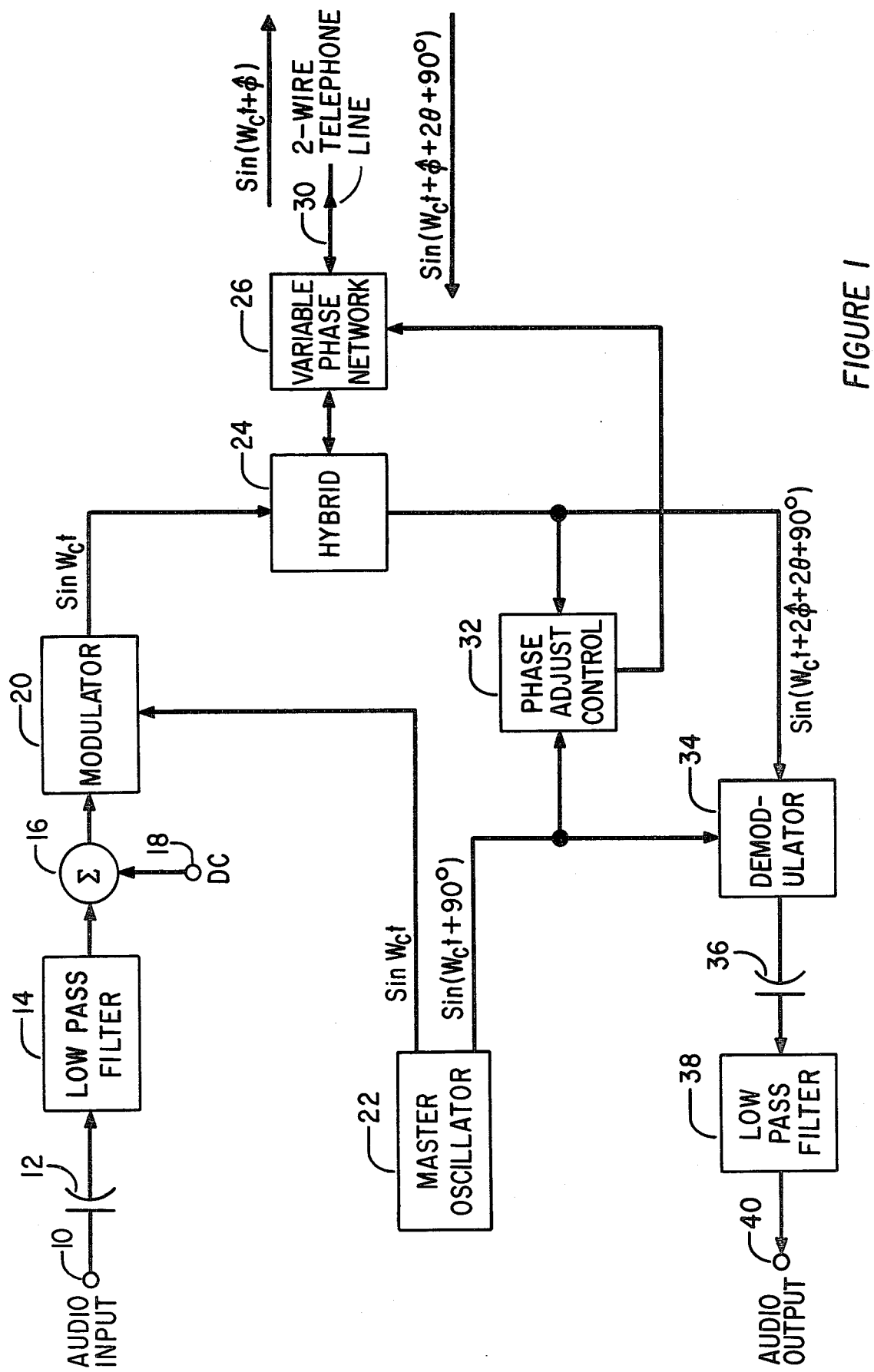
FIG. 1 is a schematic circuit diagram, in block form, of a preferred embodiment of a central station of the two-wire system data communication system of the invention.

Referring to FIG. 1, an embodiment of the central office station of the quadrature carrier system of the invention is shown. The central office station is part of an overall double sideband, amplitude modulation system. As noted above, in accordance with an aspect of the invention, the transmit carrier ($\sin w_c t$) and receive carrier ($\sin w_c t + 90$) are 90° out of phase, independently of the remainder of the system.

The audio input to the central station is applied to an audio input terminal 10 and passes through a capacitor 12 to a low pass filter 14. Filter 14 is used to remove components of the audio input above 3 kHz. This determines the bandwidth of the subscriber carrier since, as explained below, balanced modulation with a sinewave carrier is used to generate the double sideband, amplitude modulated signal. The output of filter 14 is connected to a summer 16 which also receives a d.c. input applied to a d.c. input terminal 18. The d.c. component is added to ensure that the carrier is being transmitted at all times (less than 100% modulation).

The output of summer 16 is connected to a balanced modulator 20 which also receives a $\sin w_c t$ carrier input from a master oscillator 22. The transmit carrier is basically the master carrier and all other carriers are slaved thereto. Modulator 20 is connected to a conventional hybrid 24 which permits the transmit signal to drive the two-wire telephone line, denoted 30, while minimizing the amount of the central office transmit signal that is actually "seen" by the central office receiver. Hybrid 24 is connected to two-wire line 30 through a bidirectional variable phase network 26 which is discussed hereinbelow.

The receive output of hybrid 24 is connected to a phase adjustment control circuit 32 which is also described below and which receives, as a second input, the $\sin(w_c t + 90°)$ output of master oscillator 22. The receive output of hybrid 24 is also connected to a balanced demodulator 34 which is also connected to a $\sin(w_c t + 90°)$ demodulating carrier signal from master oscillator 22. Balanced demodulator 34 is connected through a capacitor 36 and a low pass filter 38 to an audio output terminal 40.

Referring to FIG. 2, an embodiment of the subscriber station is shown which is adapted to cooperate with the central office station of FIG. 1. The station of FIG. 2 includes a hybrid 42 which is connected to the two-wire telephone line 30. Like hybrid 24 of the central office station, hybrid 42 is used to separate the transmit and receive signals that occur simultaneously on two-wire line 30.

Before proceeding with the description of FIG. 2, it should be noted that at both stations the amount of separation available is a function of how well the impedance of the hybrid matches that of the telephone line. Various types and sizes of wire are used for telephone lines and this necessitates the use of a variable impedance hybrid or a modulation scheme which is immune to the interference produced where there is a mismatch. The quadrature carrier modulation technique disclosed herein provides the required immunity so that the hybrids 24 and 42 do not have to be adjusted.

Thus, referring again to FIG. 2, the output of hybrid 42 is connected to the input of a balanced demodulator 46 and to the input of a phase locked loop 48. The output of phase locked loop 48 forms the second input to demodulator 46 and this output, shifted by 90°, forms the second input to modulator 44. The receiver branch, which includes demodulator 46, also incorporates a capacitor 50, and a low pass filter 52, the latter of which is used to reduce noise and the amount of interference from other frequency carriers. The output of filter 52 is connected to an audio output terminal 54. The transmitter branch includes an audio input terminal 56, a capacitor 58, a low pass filter 60 and a summer 62 having a d.c. input 64, and a balanced modulator 44. This subscriber station transmitter is similar to that of the central office station.

The subscriber station carrier is transmitted back to the central office through hybrid 42 and two-wire line 30 to the central office hybrid 26 (FIG. 1). Because the demodulating carrier at the central office is locked at 90° to the central office transmit carrier, variable phase network 26 is adjusted to align the receive line signal to the carrier.

The system as a whole can perhaps be best understood if the carrier phase is considered at various points in the system. Thus, referring to FIGS. 1 and 2 together, the carrier at the central office transmitter (the branch containing modulator 20) will be assigned the value $\sin w_c t$ as noted above. Assuming that variable phase network 26 produces a delay $\phi$, the transmit signal is of the form $\sin(w_c t + \phi)$ when entering line 30. Assuming a delay in line 30 of the value $\theta$, the carrier received at the subscriber station is of the form $\sin(w_c t + \phi + \theta)$. As noted above, this signal is phase shifted 90° in phase locked loop 48 to produce the transmit carrier for the subscriber station (the input to modulator 44) and thus is 90° out of phase with the receiver carrier. After passing back through telephone line 30, the received input to variable phase network 26 is of the form $\sin(w_c t + \phi + 2\theta + 90°)$ and at the output thereof is of the form $\sin(w_c t + 2\phi + 2\theta + 90°)$. Phase adjustment control circuit 32 thus is utilized to adjust the delay of variable phase network 32 such that $$2\phi + 2\theta = 180 N$$

where N is a positive non-zero integer (N = 1,2,3, . . .). Since the value of $\theta$ is fixed by the particular telephone line used, the delay $\phi$ of variable phase network 32 is varied until the foregoing equation is satisfied. Under these circumstances, the receive carrier at the central office station is 90° out of phase with the transmit carrier and hence interference is a minimum.

Although the units of the system of FIGS. 1 and 2 could be readily implemented by one skilled in the art based on the functions they are to perform, the make-up of several of these units will be considered for purposes of completeness. Thus, referring to FIG. 3, a exemplary embodiment of hybrid 24 is illustrated. As illustrated, hybrid 24 can take a form of a duplexer circuit comprising an operational amplifier 67 and associated resistors 65, 69 and 66 and capacitor 68. Hybrid 24 is connected to variable phase network 26 (and thence to transmission line 30) from a point on the junction between resistor 69 and the non-inverting input of operational amplifier 60. A similar duplexer circuit is disclosed in "Electronic Design", Jan. 4, 1975, pp. 76 to 77 and reference is made to those pages for a more complete description of the circuit.

Variable phase network 26 can conveniently comprise a variable capacitor connected in parallel with a pair of inductances, with a point on the junction between the inductances being connected to ground through the series combination of a capacitor and inductance. Network 26 can obviously take other forms as well.

An exemplary embodiment of phase adjustment control circuit 32 is illustrated in FIG. 4. Control circuit 32 basically comprises a phase comparator 70, which may be an RCA type CD4046A, and a low pass filter and offset circuit formed by shunt filter capacitors 72 and 74, series resistors 76 and 78, and operational amplifier 84 together with associated capacitor 82, resistors 86, 88 and potentiometer 90. Adjustment is provided by potentiometer 90.

Although the invention has been described relative to exemplary embodiments thereof, it will be understood that other variations and modifications can be effected in these embodiments without departing from the scope and spirit of the invention.

I claim:
1. A communication system which enables signals to be simultaneously transmitted and received on a two-wire line in the same spectrum, the system comprising:
   a first station comprising:
      transmitter means including means for modulating a transmit carrier with an input signal to produce a transmit signal;

receiver means including means for demodulating a received signal with a signal corresponding to the transmit carrier phase shifted by 90° to produce an output signal; and a variable phase network for automatically adjusting the phase of the received signals so that the received carrier signal is 90° out of phase with the transmit carrier signal; and a second station connected to the first station by the two-wire transmission line comprising:

means for receiving the first station transmit signal;

a phase locked loop, responsive to the transmit signal of the first station, for generating a first recovered carrier signal corresponding to the first station transmit carrier and a second recovered carrier signal corresponding to the first station transmit carrier phase shifted by 90°;

transmitter means including means for modulating the second recovered carrier signal with an input signal to produce a transmit signal; and means, connected to the output of the second station receiving means, for demodulating the first station transmit signal with the first recovered carrier to produce an output signal.

2. The system of claim 1 wherein the first and second stations each include means for adding a direct current signal to the respective input signals prior to their application to the respective transmitter modulator means to ensure that carrier signals are transmitted at all times by the first and second stations.

3. The system of claim 1 further including:

first hybrid means for simultaneously applying the first station transmit signal to the two-wire line and for receiving a signal applied to the first station over the two-wire line; and second hybrid means for simultaneously applying the second station transmit signal to the two-wire line and for receiving the first station transmit signal.

4. The system of claim 1 further comprising a master oscillator at the first station for generating the first station transmit carrier and the signal corresponding to the transmit carrier phase shifted by 90°, and phase adjustment control means responsive to the transmit carrier and the received signal for controlling the variable phase network.

5. The system of claim 1 wherein the first and second station transmitter means each include low pass filter means connected in advance of each solid modulator means for band-limiting each respective input signal to a selected bandwidth.

6. A central transmit-receive unit for a communication system which enables signals to be simultaneously transmitted and received on a two wire line in the same frequency band, the central unit comprising:

means for transmitting a signal including means for modulating a carrier signal with an input signal to produce a transmit signal in a given frequency band;

means for receiving a signal in the same frequency band as the transmit signal, including means for demodulating the received signal, the received signal being substantially in quadrature with the transmit signal; and means for automatically adjusting the phase of the received signal to compensate for delays in the communication system, the phase adjusting means including a variable phase network connected to the transmitter and receiver means, and means for comparing the phase of the received signal with a reference signal to control the phase adjustment of the variable phase network whereby the received signal and transmit signal are maintained in quadrature.

7. The unit of claim 6 further including means for adding a direct current signal to the input signal prior to its application to the modulator means to ensure that a transmit carrier signal is transmitted at all times.

8. The unit of claim 6 further including hybrid means connected to the output of the transmitter means, the input of the receiver means, and the two-wire line.

9. The unit of claim 6 further comprising a master oscillator at the transmit-receive unit for generating the transmit carrier and for generating a signal corresponding to the transmit carrier phase shifted by 90°, and wherein the phase adjustment control means is responsive to the transmit carrier and the received signal for controlling the variable phase network.

10. The unit of claim 6 further including low pass filter means connected in advance of the transmit modulator means for band-limiting the input signal to a selected bandwidth.

11. The unit of claim 6 in combination with a second transmit-receive unit for communicating therewith, the second unit comprising:

means for recovering the carrier of a signal received thereby;

means for demodulating the received signal with the recovered carrier;

means for generating a second unit transmit carrier phase shifted from the recovered carrier by 90°; and transmitter means including means for modulating the second unit transmit carrier with an audio input signal.

12. The unit of claim 11 further including means for adding a direct current signal to the audio input signal prior to its application to the second unit modulator means to ensure that a transmit carrier signal is transmitted at all times by the second unit.

13. The unit of claim 11 further including hybrid means connected to the output of the second unit transmitter means, an input of the second unit demodulator means, an input of the second unit carrier recovery means, and to the two-wire line.

14. The unit of claim 11 further including low pass filter means connected in advance of the second transmit-receive unit modulator means for band-limiting the second unit input signal to a selected bandwidth.

15. A communication system which allows simultaneous two-way transmission and reception of signals in the same frequency band along a two-wire line, the system comprising:

(A) a central station comprising:

(1) a signal transmitter including:

(a) means for generating first and second carrier signals, the second carrier signal being 90° out of phase with the first carrier signal; and (b) means for modulating the first carrier signal with an audio signal to produce a transmit signal;

(2) hybrid means for simultaneously applying the transmit signal to the two-wire line and for receiving a signal applied to the central station over the two-wire line; and (3) a signal receiver, including:

(a) means for demodulating the received signal with the second carrier signal to produce an audio output signal;
(b) means, responsive to the second carrier signal and the received signal, for outputting a signal representative of a detected phase difference between the two signals; and
(c) means, connected between the two-wire line and the hybrid means and responsive to the phase difference signal, for varying the phase of transmitted and received signals applied along the two-wire line whereby these signals are maintained substantially in quadrature; and (B) a subscriber station comprising:
(1) a signal receiver, including:
(a) phase locked loop means, responsive to the transmit signal from the central station, for generating a first carrier signal in phase with the received transmit signal and a second carrier signal 90° out of phase with the received transmit signal;
(b) means for demodulating the received signal applied to the subscriber station with the first carrier signal to produce an audio output signal;
(2) a signal transmitter, including means for modulating the second carrier signal with an audio signal to produce a transmit signal; and
(3) hybrid means for simultaneously applying the subscriber station transmit signal to the two-wire line and for receiving the central station transmit signal.

16. The system of claim 15 wherein the signal transmitters of both the central and subscriber stations each include means for adding a direct current signal to the respective audio input signals prior to their application to the respective modulator means to ensure that transmit signals are transmitted at all times by the central and subscriber stations.

17. The system of claim 15 wherein the central station and subscriber station signal transmitters each include low pass filter means connected in advance of each respective modulator means for band-limiting each respective input signal to a selected bandwidth.

* * * * *

UNITED STATES PATENT AND TRADEMARK OFFICE
CERTIFICATE OF CORRECTION

PATENT NO. : 4,380,062

DATED : April 12, 1983

INVENTOR(S) : Richard L. Stuart et al

It is certified that error appears in the above-identified patent and that said Letters Patent are hereby corrected as shown below:

Column 1, line 51, "as" should read -- than --.

Column 2, line 31, "thereinbelow" should read -- hereinbelow --.

Column 3, line 56, "26" should read -- 24 --.

Column 4, line 12, "32" should read -- 26 --.

Column 4, line 18, "32" should read -- 26 --.

Column 4, line 35, "60" should read -- 67 --.

Claim 5, column 5, line 48, "solid" should read -- said --.

Signed and Sealed this

Twenty-eighth Day of June 1983

[SEAL]

Attest:

GERALD J. MOSSINGHOFF

Attesting Officer     Commissioner of Patents and Trademarks